US008818107B2

(12) United States Patent
Madden et al.

(10) Patent No.: US 8,818,107 B2
(45) Date of Patent: Aug. 26, 2014

(54) IDENTIFICATION GENERATION AND AUTHENTICATION PROCESS APPLICATION

(75) Inventors: Will Madden, Denver, CO (US); Chris Cochran, Highlands Ranch, CO (US); Linda Brodbeck, Littleton, CO (US); Joe Anzures, Aurora, CO (US)

(73) Assignee: The Western Union Company, Englewood, CO (US)

( * ) Notice: Subject to any disclaimer, the term of this patent is extended or adjusted under 35 U.S.C. 154(b) by 206 days.

(21) Appl. No.: 13/414,598

(22) Filed: Mar. 7, 2012

(65) Prior Publication Data

US 2013/0236109 A1 Sep. 12, 2013

(51) Int. Cl.
*G06K 9/68* (2006.01)
*G06K 9/00* (2006.01)

(52) U.S. Cl.
USPC .......................................... 382/218; 382/118

(58) Field of Classification Search
None
See application file for complete search history.

(56) References Cited

U.S. PATENT DOCUMENTS

| | | | | |
|---|---|---|---|---|
| 6,493,677 | B1 * | 12/2002 | von Rosen et al. | 705/26.5 |
| 6,885,475 | B1 * | 4/2005 | Yoshida | 358/1.9 |
| 7,711,618 | B2 * | 5/2010 | Petrime et al. | 705/35 |
| 7,809,172 | B2 * | 10/2010 | Lubow | 382/118 |
| 7,992,774 | B2 * | 8/2011 | Lynch et al. | 235/379 |
| 8,381,972 | B2 * | 2/2013 | Beemer et al. | 235/380 |
| 8,544,731 | B2 * | 10/2013 | Elgar et al. | 235/380 |
| 2003/0160444 | A1 * | 8/2003 | Durso | 283/77 |
| 2004/0099730 | A1 * | 5/2004 | Tuchler et al. | 235/380 |
| 2008/0052620 | A1 * | 2/2008 | Hwang | 715/272 |
| 2008/0091459 | A1 * | 4/2008 | Elgar et al. | 705/1 |
| 2012/0330952 | A1 * | 12/2012 | Kong et al. | 707/737 |

* cited by examiner

*Primary Examiner* — Daniel Mariam
(74) *Attorney, Agent, or Firm* — Kilpatrick Townsend & Stockton LLP

(57) ABSTRACT

Embodiments of the invention provide methods, devices, and systems for personalizing presentation instruments. According to one embodiment, a method for personalizing presentation instruments may include providing account information for a plurality of accounts and providing a plurality of images. Each of the images may be associated with an account and may be formatted according to one or more defined parameters to facilitate placement of each image onto a presentation instrument. Each formatted image may be overlaid or placed onto a presentation instrument to personalize each presentation instrument and each presentation instrument may be associated with account information corresponding to the image overlaid or placed on the presentation instrument.

19 Claims, 6 Drawing Sheets

IDENTIFICATION GENERATION AND AUTHENTICATION PROCESS APPLICATION

BACKGROUND OF THE INVENTION

Embodiments of the invention are generally directed toward presentation instruments and more specifically toward methods, systems, and devices for providing or creating personalized presentation instruments.

Presentation instruments, such as debit cards, credit cards, charge cards, stored value cards, prepaid cards, smart cards, RFID cards, checks, contactless cards, membership cards, employee cards and badges, and the like, are commonly used to purchase goods and/or services, as a form of identification, and/or to gain access to facilities or events. A common form of presentation instruments is credit or debit cards which are often given to consumers by issuing banks or other entities to allow the consumer to transfer funds (or use credit) from an account associated with the presentation instrument. Often, these presentation instruments include generic colors, logos, and/or images, such as the logo of the issuing bank, although some issuing banks or entities allow the consumer to select cards from among a limited number of different colors, logos, and/or images. One reason for the generic colors, logos, and/or images, or the limited options for colors, logos, and/or images, is that presentation instruments are usually requested and produced in large quantities or batches. The large production batches makes it difficult to personalize each of the presentation instruments. Further, issuing banks or entities typically like to control the content that is placed or overlaid onto presentation instruments. For this reason, any card personalization services that are offered to consumers often require extensive or prolonged approval and production times often resulting in increased costs to consumers and/or issuing banks or entities.

BRIEF SUMMARY OF THE INVENTION

Embodiments of the invention are generally directed toward methods, systems, and devices for providing or creating personalized presentation instruments. According to one embodiment, a method for providing personalized presentation instruments is provided. The method may include providing account information for a plurality of accounts and providing a plurality of images. Each image of the plurality of images may be associated with an account. Each image of the plurality of images may also be formatted according to one or more defined parameters so as to facilitate placement of each image onto a presentation instrument. Each formatted image of the plurality of images may then be placed or overlaid on a presentation instrument so as to personalize each presentation instrument. The method may also include associating each presentation instrument with the account corresponding to the image overlaid on the presentation instrument.

The method may further include identifying the account corresponding to the image overlaid on the presentation instrument by comparing an identifier of the image with an identifier of the account. The method may additionally include determining that the image is allowed to be overlaid on the presentation instrument, such as by comparing the image to a database of images (e.g., a blacklist of images) that are not allowed to be overlaid on presentation instruments. The database of images that are not allowed to be overlaid on presentation instruments (e.g., blacklist database) may include images such as trademarks, copyrighted images, and/or other blacklisted images.

The method may additionally include comparing the image overlaid on the presentation instrument with the corresponding image of the plurality of images to ensure that the image overlaid on the presentation instrument meets a defined quality. Comparing the image overlaid on the presentation instrument with the corresponding image of the plurality of images may include comparing a hash value of the image overlaid on the presentation instrument with a hash value of the corresponding image of the plurality of images. The method may additionally include determining that one or more of the images overlaid on the presentation instruments require review by a user and routing the one or more of the images to the user for review.

According to another aspect, a method for placing a plurality of images onto a plurality of presentation instruments to personalize each of the presentation instruments is provided. The method may include providing a plurality of images, providing a plurality of presentation instruments, formatting each image of the plurality of images according to one or more defined parameters, placing each image on a presentation instrument so as to personalize each presentation instrument, and associating each of the presentation instruments with an account corresponding to the image placed on the presentation instrument.

In some embodiments, associating each of the presentation instruments with an account may include writing account data onto a magnetic stripe of the presentation instrument or encoding an RFID chip of the presentation instrument. In some embodiments, formatting each image may include adjusting a spacing of at least one of the images. In some embodiments, formatting each image may include adjusting an angle of at least one of the images.

The method may also include determining if the image is allowed to be placed on the presentation instrument by comparing the image to a database of blacklisted images to determine that the image is not allowed to be placed on the presentation instrument, or comparing the image to a database of whitelisted images to determine that the image is allowed to be placed on the presentation instrument. The method may further include determining that the image placed on the presentation instrument meets a defined quality by comparing a hash value of the image placed on the presentation instrument with a hash value of the corresponding image of the plurality of images. The method may additionally include determining that one or more of the images placed on the presentation instruments require review by a user and routing the one or more of the images to the user for review. Input may be received from the user as to adjusting one or more parameters of the one or more of the images routed to the user for review.

According to another embodiment, a system for providing personalized presentation instruments is provided. The system may include a memory device and a processor communicatively coupled with the memory device. The memory device may have instructions stored thereon which, when executed by the processor, cause the processor to perform the following operations: receive a plurality of images, format each image of the plurality of images according to one or more defined parameters, overlay each formatted image on a presentation instrument to personalize each presentation instrument, and associate each presentation instrument with an account corresponding to the image overlaid on the presentation instrument. The instruction may also cause the processor to determine that the image overlaid on the presentation instrument meets a defined quality by comparing a hash value of the image with a hash value of a corresponding image of the plurality of images.

According to another embodiment, a method for personalizing a presentation instruments is provided. The method may include: receiving a plurality of images, formatting each image of the plurality of images according to one or more defined parameters, overlaying each formatted image on a presentation instrument template, saving a processing file for each of the formatted images overlaid on the presentation instrument templates, and associating each processing file with account data corresponding to the image overlaid on the presentation instrument template. The method may also include transmitting each of the processing files to a processing entity so that each of the images and corresponding account data are overlaid on a presentation instrument.

BRIEF DESCRIPTION OF THE DRAWINGS

The present disclosure is described in conjunction with the appended figures.

Figure 1:
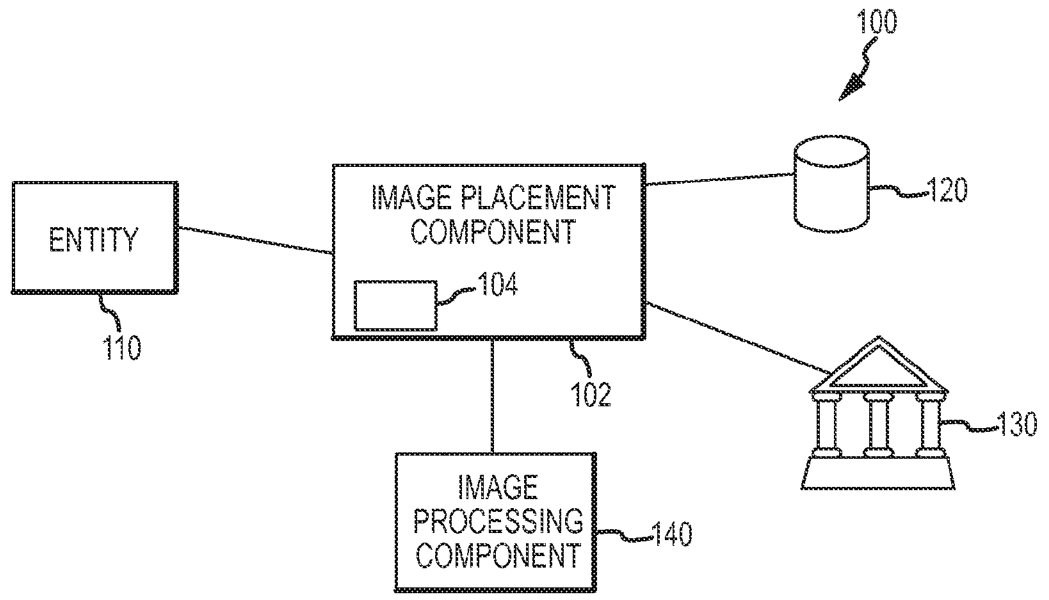
FIG. 1 illustrates a system for providing personalized presentation instruments according to an embodiment of the invention.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "memory device," "machine-readable medium," and the like includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In one embodiment, the invention provides systems, methods, and devices for placing or overlaying images onto a plurality of presentation instruments. The process may be automated so that a large number of images may be placed on the presentation instruments with little to no intervention or interaction by a user. The images may be associated with, or otherwise correspond, with one or more accounts. In one embodiment, the images are associated with financial accounts. In one embodiment, the presentation instruments may be instruments that allow a user to withdraw funds from the financial account to pay for one or more items or services. For example, in some embodiments, the presentation instruments include credit cards, debit cards, checks, radio frequency identification (RFID) cards, smart card, charge card, and the like.

In another embodiment, the images are associated with non-financial accounts, such as an employee account, and the presentation instrument serves as a form of identification for the employee. For example, the employee identification card may allow the employee to access facilities of a company and/or permit the employee to access otherwise restricted areas. In another embodiment, the account the images are associated with may be virtually any other type of account (e.g., a club membership, library membership, union membership, health-club membership, customer loyalty program, and the like) and the presentation instrument may be any type of instrument corresponding to the account (e.g., membership card, badge, and the like).

In yet another embodiment, the images are not associated with an account. In such embodiments, the methods, systems, and devices described herein provide means that allow a plurality of images to be quickly and conveniently placed or overlaid onto presentation instruments without associating the presentation instruments with an account. For example, an employer may desire to provide employees with identification cards that show the employee is employed by the employer, but that do not necessarily provide the employee with any privileges (e.g., access to company facilities, restricted areas, and the like). Similarly, an online community may provide its members with identification cards that do not provide any privileges other than associating the member with the online community.

The image placement or overlayment process may be automated so that little to no user interaction is required. For example, a company may provide an image placement service with an image database and request that the images be placed or overlaid on presentation instruments. The image placement service may format each of the images according to one or more image parameters, such as by adjusting the image, cropping the image, altering the image, and the like, to fit a defined resolution, size, angle, image distance, and the like. The image may be formatted to fit a defined image template for the presentation instrument. The image placement service may also produce a hash value for the images, a digital fingerprint, and the like. The image placement service may then save a processing file of the formatted images, the image hash values, and/or digital fingerprints. Account data (e.g., financial account data, membership data, and the like) may then be associated with individual files within the processing file, and the processing file may be transmitted to an image processing service so that presentation instruments may be created having the digital images overlaid thereon and account data associated therewith. In other embodiments, the image placement service may place or overlay the images onto presentation images instead of, or in addition to, saving the processing file.

The image placement service, or the image processing service, may compare the placed or overlaid images with the original image to ensure that the image value or quality meets or exceeds a defined standard, to ensure that the correct image was overlaid or placed on the correct presentation instrument, and/or ensure that an error did not occur during image placement (e.g., blurring, smudging, image streaks, and the like). The image placement service may also compare the images with a blacklist and/or whitelist of images to determine whether the images may be placed onto presentation instruments. For example, the image placement service may determine if the images include trademarks, copyrighted material, inappropriate or offensive marks or images, and the like. In one embodiment, the image placement service may determine if the image corresponds to an image of an untrustworthy individual. For example, a financial institution, club, government entity, employer database, online or social media database, and the like, may have a database of images of individuals that the entity believes are untrustworthy. For example, a government entity may have a database of images of known felons, fugitives, terrorists, and the like. The image placement service may compare the images that are to be placed or overlaid on presentation instruments with this database to determine if the image corresponds to an individual the entity believes is untrustworthy. If a match is found between one of the images and an image in the database, the image placement service may prevent a presentation instrument from being made for the untrustworthy individual.

In other embodiments, an essentially opposite process may occur where the image placement service compares the images with a whitelist of images to determine that the images may be placed or overlaid onto a presentation instrument. For example, employees may submit images that they wish to be placed or overlaid onto an employee identification card. The image placement service may compare the image with an employee database provided by the employer to verify that the image submitted corresponds to an actual employee. If the submitted image does correspond to an image in the employer's image database, the image placement service may allow the submitted image to be placed or overlaid onto an employee identification card. In contrast, if the submitted image does not correspond to an image in the employer's image database, the image placement service may prevent the submitted image from being placed or overlaid on an employee identification card. In this manner, fraudulent activities may be prevented, such as non-employees obtaining an employee identification card, untrustworthy individuals from obtaining financial cards, and the like. These and other aspects of the invention will become more apparent with reference to the figures.

Referring now to FIG. 1, illustrated is a system 100 for providing personalized presentation instruments, such as personalized credit cards, debit cards, checks, club membership cards or badges, identification cards, and the like. FIG. 1 shows system 100 including several different entities and/or components that perform various functions, although it should be realized that in some embodiments, all or a portion of these functions or components may be performed and/or controlled by a single entity. System 100 includes an image placement component 102 that may interface with one or more other components or entities to place or overlay images onto presentation instruments to personalize the presentation instruments. Image placement component 102 includes a computing device 104 that may include a memory device, processor, and/or communication device as described herein, that allow image placement component 102 to perform the various operations described herein and/or communicate with other components or entities, such as to receive an image database, transmit various instructions or files, receive input and provide output, and the like.

System 100 also includes a database 120 that may be accessed by computing device 104. Database 120 may be an internal or external database with respect to image placement component 102. Database 120 may include the images that are to be placed on presentation instruments, may include the whitelist or blacklist; may include image verification rules, may include account data to be assigned or associated with the presentation instruments, and the like. System 100 also include an account component or entity 130. Account component 130 may represent financial accounts of various users and/or any of the other types of accounts described herein. Account component 130 may also represent a financial or other institution that maintains one or more financial or other accounts for a user, such as an issue bank, funds transfer provider, and the like. Account information may be received from the financial or other institution. In a specific embodiment, account component 130 represents stored value accounts, credit card accounts, debit card accounts, and the like that are maintained by an entity separate from an entity that maintains or controls image placement component 102. In another embodiment, the same entity maintains and/or controls both account component 130 and image placement component 102.

System 100 additionally includes an image processing component 140 that may be the component or entity that physically places or overlays the images onto the presentation instruments. In one embodiment, image placement component 102 creates a processing file that includes the images, and optionally corresponding account data, that is to be placed onto the presentation instruments. This processing file is then transmitted to image processing component 140 so that the images, and optionally account data, may be physically placed or overlaid onto the presentation instruments. Image processing component 140 may be controlled by an entity separate from image placement component 102, or these components may be controlled by a single entity.

Image placement component 102 may communicate with an entity 110 that desires image placement services. For example, entity 110 may be a financial institution that desires to create personalized presentation instruments for its customers that have current accounts (e.g., stored value account, checking accounts, savings accounts, line of credit accounts, and the like). In another embodiment, as described herein, entity 110 may be an employer desiring employee identification cards or badges, a club (e.g., fitness club, sporting club, and the like) desiring membership cards or badges, and the like. Entity 110 may provide a request for image placement services along with an image database and/or account information to image placement component 102. Image placement component 102 may then perform the operations described herein and/or communicate with various other components or entities (e.g., database 120, account component 130, image processing component 140) so that personalized presentation instruments are created including the images and, optionally, corresponding account information.

In one embodiment, entity 110 requests image placement services from image placement component 102 for entity 110's employees and/or customers and provides an image database of its employees and/or customers. In another embodiment, the images correspond to online or social media profile images of the employees and/or customers. Image placement component 102 then requests and receives account information (e.g., financial account information, employee account information, and the like) from account component 130. Image placement component 102 may then associate each image of the image database with corresponding account information and coordinate with image processing component 140 (e.g., transmit a processing file or instructions) to overlay the images onto presentation instruments and associate (e.g., write or encode) the presentation instruments with corresponding account information.

In a specific embodiment, entity 110 is a financial institution, such as a funds transfer institution, desiring personalized presentation instruments for customers having financial accounts with entity 110, such as stored value accounts, checking accounts, savings accounts, and the like. To provide customers with personalized presentation instruments, entity 110 provides an image database (e.g., from online or social media profiles) for its customers to image placement component 102 and also provides financial account information for those customers, such as a stored value account number, checking account number, savings account number, and the like. Account information may be obtained or provided from account component 130. Image placement component 102 then formats the images as described herein and communicates with image processing component 140 so as to place or overlay the images on the presentation instruments and write the corresponding financial data to the presentation instruments. Database 120 may be accessed to check a whitelist, blacklist, verify image placement, and the like.

In one embodiment, the components, 102, 120, 130, and 140, are components of a system internal to entity 110 so that essentially the entire image placement process, or a majority thereof, occurs internal to entity 110.

Figure 2:
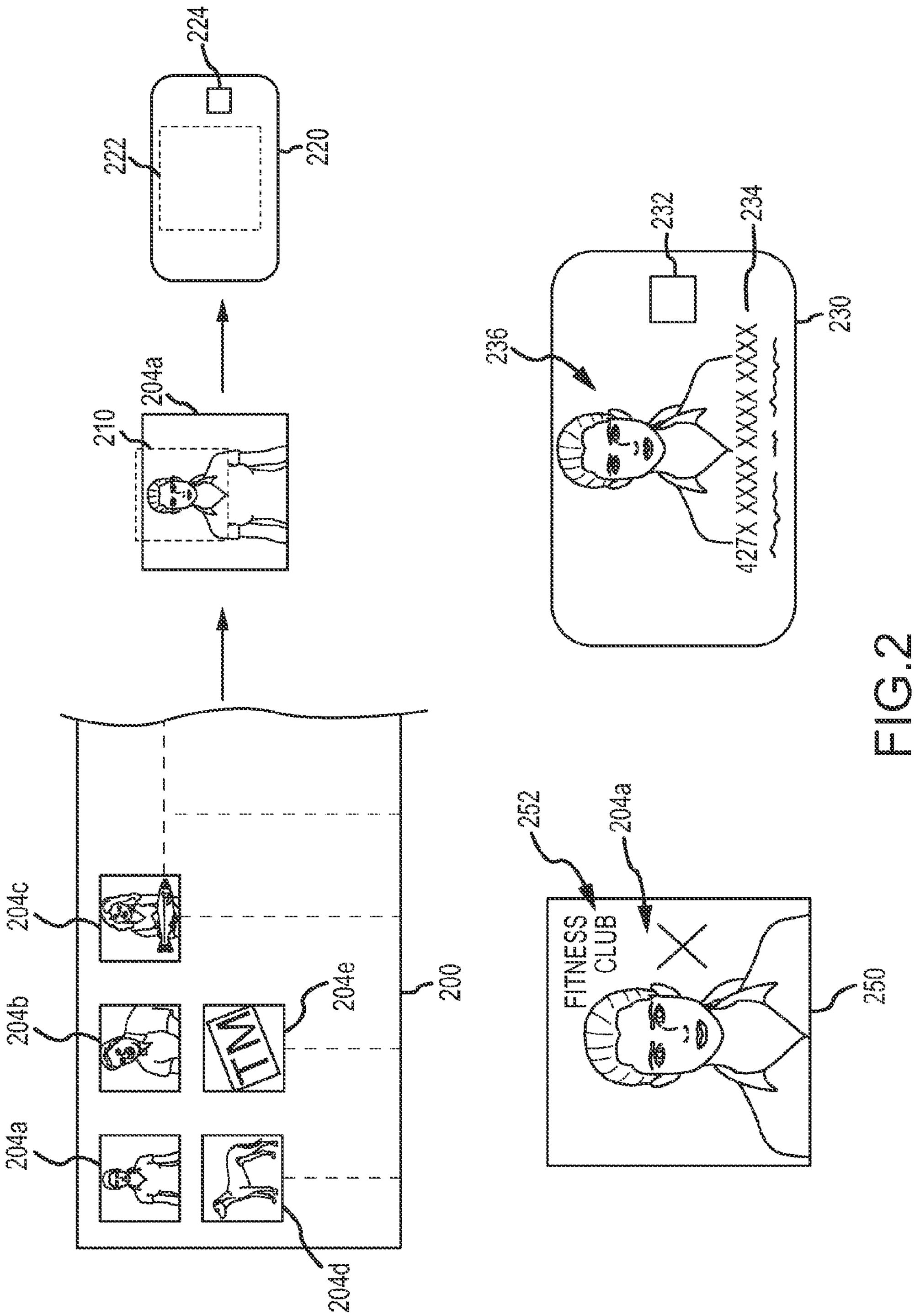
FIG. 2 illustrates a process for providing personalized presentation instruments according to an embodiment of the invention.

Referring now to FIG. 2, illustrated is an embodiment of an image placement process. The process begins with a plurality or database 200 of images being provided to an image placement service, such as image placement component 102 described above. Database 200 includes images 204*a-e*, which corresponds to various users or customers. In one embodiment, the images may be images provided by customers of a financial institution, may be employee photographs, may be club membership images, may be images from online or social media profiles, and the like. The images need not be photographs of the customer or user. For example, image 204*c* shows an image of a customer or user holding a trophy fish, while 204*d* shows a customer or user's pet, and 204*e* shows a trademark or drawing. In one embodiment, the customer or user provides any image they desire to place on a presentation instrument. For example, a financial institution, club, and the like may advertise the creation of the presentation instruments and solicit images or photographs from the users. In another embodiment, such as an employee database, club membership, and the like, the images may be photographs taken by the employer, club representative, and the like, such as during enrollment in the club or on a hire date. In still another embodiment, members of an online or social media service may request the creation of presentation instruments and instruct that images associated with their online or social media profiles be used in the creation of the presentation instruments.

The images may then be formatted according to one or more parameters so that the images may be placed onto a presentation instrument. Formatting the image may include adjusting or modifying a resolution of the image, a size of the image, an angle of the image, a spacing of the image, converting a file type of the image, and the like. For example, FIG. 2 shows image 204*a* being formatted so that the image is cropped outside of a defined image boundary 210. To appropriately crop the image, for example to crop the image so that a user's face is centered within the image, facial recognition software may be used to detect where the user's face appears on the image. Facial recognition software and/or other image software may also be used to rotate the image. In one embodiment, the image placement system may define the image boundary 210 so that the formatted images focuses mainly on one or more aspects of the image, such as the user's face. For example, the image placement service may vary the image boundary 210 from image to image and/or rotate the images so that the formatted images all appear to be roughly equivalent in size and/or equivalent in image angle. Put another way, all of the formatted images appear to be taken from roughly the same angle and the same distance. In this manner, images (e.g., such as club membership databases, employee databases, online and social media databases, and the like) that have roughly similar but slightly varying characteristics may be formatted so that the appearance is essentially equivalent. For example, the images in employee databases and club memberships are often similar in that they are often taken with the employee or club member standing directly in front of the camera. However, the images often vary slightly because the distance of the camera to the individual and/or the angle of the camera relative to the individual are often slightly different. Varying the image boundary 210 between images and/or slightly rotating the images may remove or reduce these slight variation and produce roughly equivalent looking images. Additional image editing software may be used to reduce redeye, brightness, contrast, image quality, and the like, to provide roughly equivalent looking images.

In another embodiment, the image (or a copy of the image) may be cropped, rotated, or otherwise removed from the originally provided image (e.g., 204*a*) and the image may be overlaid or placed on an identified background prior to being placed or overlaid on the presentation instrument. For example, as shown by image 250, an employer, club, financial institution, and the like may desire that image 240*a* be placed or overlaid on a logo, image, and/or trademark 252 that identifies the employer, club, financial institution, and the like. The logo, image, and/or trademark 252 may be overlaid or placed on the presentation instrument before image 204*a* is placed or overlaid on the presentation instrument, or both images (i.e., image 204*a* and logo, image, and/or trademark 252) may be placed or overlaid on a template and subsequently overlaid or placed on the presentation instrument simultaneously.

In one embodiment, when the system is not able to determine where to draw image boundary 210, the image may be transmitted to a user for review and further instruction (e.g., boundary drawing instructions), and/or transmitted to the customer corresponding to the image for review and further instruction. A similar process to that described above may be performed when the image includes images other than user photographs, such as sporting events, important events or dates, non-human images, sketches, and the like.

In one embodiment, the images 204*a-e* may be compared against a blacklist of images to determine if the images are allowed to be placed onto a presentation instrument. For example, image 204*e* includes an image that may be copyrighted or trademarked or include an obscene or offensive image or language. The entity requesting image placement services may not allow such images to be placed onto presentation instruments in order to avoid litigation, advertising problems, negative public relations, and/or other potential problems. The image placement service may compare image 204*e* with a blacklist of images to determine whether image 204*e* does in fact include a copyrighted, trademarked, or otherwise obscene or offensive image or language and, if it does include such an image, prevent the image from being placed or overlaid onto a presentation instrument. In other embodiments, the database of images (or images provided by customers or employees) may be compared against a blacklist that includes images of untrustworthy individuals to determine if the database of images includes any potentially untrustworthy individuals. For example a financial or other institution (e.g., club) may have an image database of customers that have proven untrustworthy in the past that the financial or other institution is concerned about having future dealings with. The database of images may be compared against the blacklist database to determine if any individuals represented within the database of images are considered potentially untrustworthy. In another embodiment, the entity requesting the image placement service may also require comparison of the images to a blacklist of images in order to automate compliance with internal or network rules, regulations or other policies.

In another embodiment, the images may be compared against a whitelist database to determine if the images may be placed or overlaid onto a presentation instrument. The whitelist database may include images that immediately qualify as being placeable onto presentation instruments including: customer photographs, marks or sketches that qualify, trademarks or copyrighted images that qualify (e.g., the company's logo), and the like. In one embodiment, as described above, customers may provide their own image, which is then checked against a photograph of the customer held by the entity or institution requesting personalized presentation instruments to verify that the customer submitting the image is in fact a customer of, or otherwise has a valid account with, the entity or institution. In yet another embodiment, the images placement service may check the images to determine if the images include obscene or offensive language, gestures, photographs, content, and the like, and ban these images from being placed or overlaid on a presentation instrument where appropriate.

With or without checking the images, the images may then be placed or overlaid onto presentation instruments. In one embodiment, the images are first laid or placed over or onto a template 220 that corresponds to a presentation instrument. The template may represent how the image will look once the image is applied to the presentation instrument. Template 220 may include an image boundary 222 that corresponds to image boundary 210 used to format the images. Template 220 and/or boundary 222 may have defined resolution, file types, image size requirements, and the like, that the images must meet. The images may be formatted to meet or exceed these parameters. Template 220 may graphically display what the presentation instrument and image will look like and may graphically display other features of the presentation instrument, such as an RFID chip 224, magnetic stripe, and/or customer indicia, such as the customer's name, account information, and the like. Using image 204*a* as an example, image 204*a* may be formatted according to boundary 210, which corresponds to template boundary 222, and then placed onto template 220 within boundary 222. Template 220 and overlaid image 204*a* may then be analyzed by the image placement system to determine that the resolution and visual quality are sufficient, that image 204*a* is within boundary 222, and the like.

In a similar manner, the remainder of the images (e.g., 204*b-e*, etc.) may be placed or overlaid onto a template 220 and/or within a boundary 222 and verified that the overlaid images are of a defined quality. A batch processing file may then be created that includes the images overlaid over the templates 220, and optionally also includes account data for the presentation instruments. The batch processing file may then be used to physically lay or place the images onto individual presentation instruments and, optionally, write or encode the corresponding account data on the presentation instruments. A hash value, digital fingerprint, or the like of each image (e.g., 204*a*), and/or the image overlaid on template 220, may be created and saved with the batch processing file. Further, the batch processing file may be encrypted to protect the customer's sensitive data and/or image.

Alternatively, the images may be placed or laid on or over the presentation instruments simultaneously with laying or placing the images on template 220 so as to avoid the need to create a batch processing file. Similarly, the presentation instruments may optionally be simultaneously encoded or written with corresponding account data so as to avoid the need to create a batch processing file. Writing or encoding account data onto the presentation instrument may include writing account data onto a magnetic stripe or RFID chip (passive or active), embossing or printing an account number and/or customer information onto the presentation instrument, and the like.

FIG. 2 illustrates an embodiment of a presentation instrument 230 having an image 236 placed or overlaid on the presentation instrument. Image 236 corresponds to image 204*a* that is provided by an entity requesting image placement services and/or submitted by a customer that is to receive presentation instrument 230. Presentation instrument 230 also includes indicia 234 associated with the customer's account information, personal information (e.g., name), an expiration date, and the like. Presentation instrument 230 may also include an RFID chip 232, magnetic stripe (not shown), and/or the like, that is encoded or written with the customer's account information.

After the image 236 is placed or overlaid on presentation instrument 230, or optionally after the image is placed or overlaid on template 220, the image may be compared against the originally submitted image to determine if the image meets or exceeds a defined quality standard and/or to determine if one or more printing or placement errors occurred during image processing. For example, a hash value or digital fingerprint of the original image may be created and compared with a hash value or digital fingerprint of the image placed or overlaid on presentation instrument 230 and/or template 220 to determine if the images match, to determine if the overlaid image is stretched, smeared, skewed, rotated, blurred, and the like, and/or to determine if a contrast, color, and/or brightness of the image is off and the visual quality is lacking.

If the presentation instruments 230 and images 236 are of sufficient quality, the presentation instruments may be subjected to further processing and/or routed to the customer or entity requesting image placement services.

Figure 3:
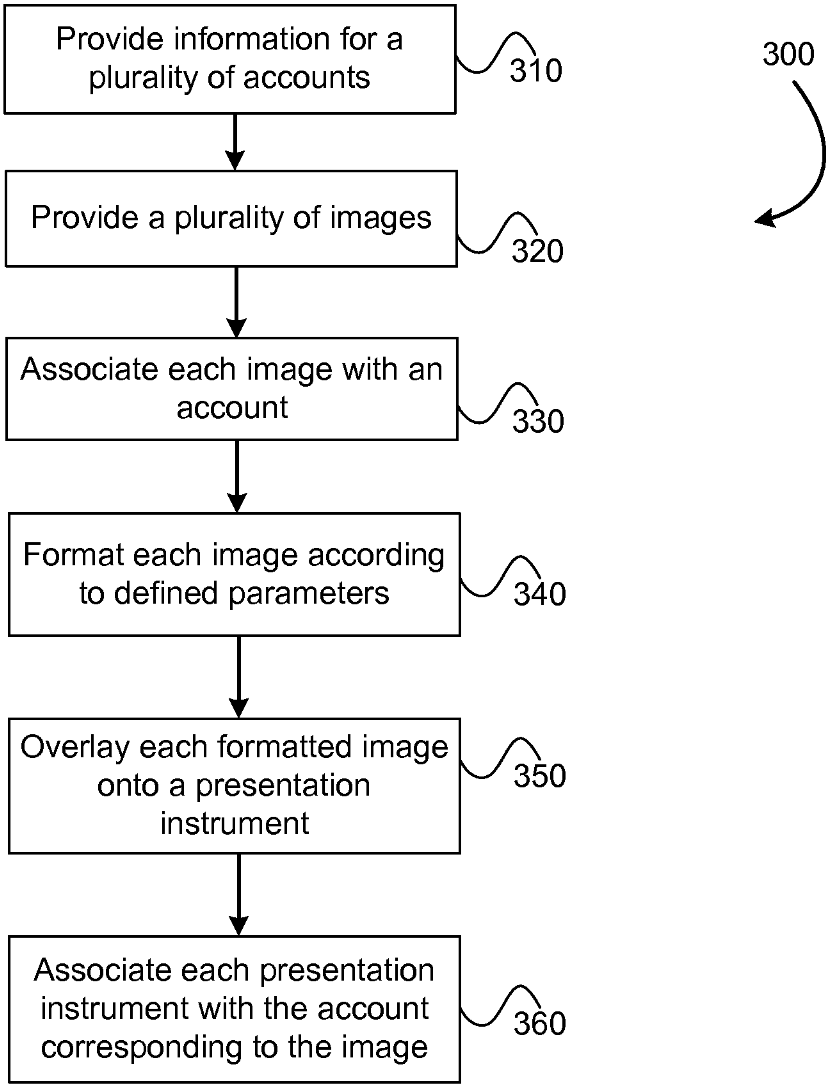
FIGS. 3-5 illustrate various block diagrams of methods for providing personalized presentation instruments according to embodiments of the invention.

Referring now to FIG. 3, illustrated is a method 300 for providing personalized presentation instruments. At block 310, account information for a plurality of accounts is provided. As described herein, the account information may be provided by an entity or institution requesting image placement services and may include financial account information, club membership information, employee information, online community information, and the like. In a specific embodiment, the account information comprises information about stored value accounts maintained by a funds transfer provider. In a further embodiment, the funds transfer provider is both the entity requesting and providing image placement services so that all or a majority of the process is performed by a single entity.

At block 320, a plurality of images are provided. As described herein, the images may be images maintained in a database by the entity requesting image placement services, by an online or social media service, and/or the images may be submitted by the entity's customers or account holders. The images may include photographs, sketches, drawings, marks, logos, and the like. At block 330, each of the images is associated with an account. To associate the images with corresponding accounts, the method 300 may include identifying the account corresponding to the image to be overlaid on the presentation instrument by comparing an identifier of the image with an identifier of the account. For example, the account information may include an identifier of the customer or individual associated with the account, such as the individual's name, birth date, social security number, employee number, state or national identification number, online or social media profile identification or name, phone number, email address, and the like. The images may also include a corresponding identifier, such as the individual's name, birth date, social security number, employee number, state or national identification number, online or social media profile identification or name, phone number, email address, and the like. The image placement service may compare the identifiers and associate images with corresponding accounts when the identifiers match. In other embodiments, the entity may provide an image (e.g., photograph) of a customer and corresponding account information for that customer and the image placement service may use facial recognition software to match an image submitted by the customer with the entity's image of the customer so as to associate the image submitted by the customer with the customer's account information. In another embodiment, optical character recognition (OCR) software could be used to recognize and read data found on an image (i.e., the individual's name, social security number, birthdate, or other identifier) of a photo ID and compare the data associated to the account with the data found on the ID. In this manner, the customers may submit photographs of themselves to use in the image placement process and the image placement service may quickly, conveniently, and automatically match those images with corresponding accounts. The customers may find these images (i.e., the customer submitted images) more appealing than the images maintained on file by the entity requesting image placement service (e.g., the employer, financial institution, club, and the like).

At block 340, each image is formatted according to one or more defined parameters. As described herein, formatting may be done to facilitate placement of each image onto a presentation instrument, such as by adjusting or modifying an image size, resolution, file type, image angle, image spacing, image boundary, and the like. The images may be formatted or normalized so that each image is roughly equivalent in appearance or may be formatted according to some other standard. If there are uncertainties in regards to formatting one or more images, these images may be sent to a user and/or the customer associated with the account for review and/or further instructions on how to proceed. For example, the customer or user can provide instructions on how to format the image, where to draw the image boundary, what contrast and/or brightness to use, and the like.

The method 300 may also include determining that the image is allowed to be overlaid on the presentation instrument. As described herein, determining that the image is allowed to be overlaid on the presentation instrument may include comparing the image to a database of images (e.g., blacklist database) that are not allowed to be overlaid on presentation instruments. The database of images that are not allowed to be overlaid on presentation instruments may include a trademark, a copyrighted image, a blacklisted image of an individual, an obscene image or gesture, an offensive image or gesture, and/or an otherwise inappropriate image.

At block 350, each formatted image is overlaid onto a presentation instrument so that each presentation instrument is personalized to the user or customer associated with the account. Overlaying the image onto a presentation instrument may involve overlaying the image onto a template corresponding to the presentation instrument and creating a batch processing file of all or a portion of the overlaid images. At block 360, each of the presentation instruments, or at least a portion thereof, is associated with the account information corresponding to the image overlaid on the presentation instrument. Associating the presentation instruments with the account information may include writing or encoding the account information onto a magnetic stripe and/or RFID chip of the presentation instrument, embossing or printing an account number, expiration date, and/or customer name on the presentation instrument, and the like.

The method 300 may also include comparing the image overlaid on the presentation instrument with the corresponding image of the plurality of images (i.e., the original image) to ensure that the image overlaid on the presentation instrument meets a defined quality. As described herein, comparing the image overlaid on the presentation instrument with the corresponding image of the plurality of images may include comparing a hash value of the image overlaid on the presentation instrument with a hash value of the corresponding image of the plurality of images. In some embodiments, when image quality is a concern or when the system is not able to determine if the overlaid image meets or exceeds the defined quality standard, the method 300 may further include determining that one or more of the images overlaid on the presentation instruments require review by a user and routing the one or more of the images (or the presentation instrument overlaid with the image) to the user for review. The user may provide input as to whether the image meets or exceeds the defined quality standard, whether the image is appropriate, and/or may adjust or modify the image so that the image meets or exceeds the quality standard. In this trimmer, the vast majority of the image placement process may be automated so as to require minimal no user input and only the occasional or unique image will require user review.

Figure 4:
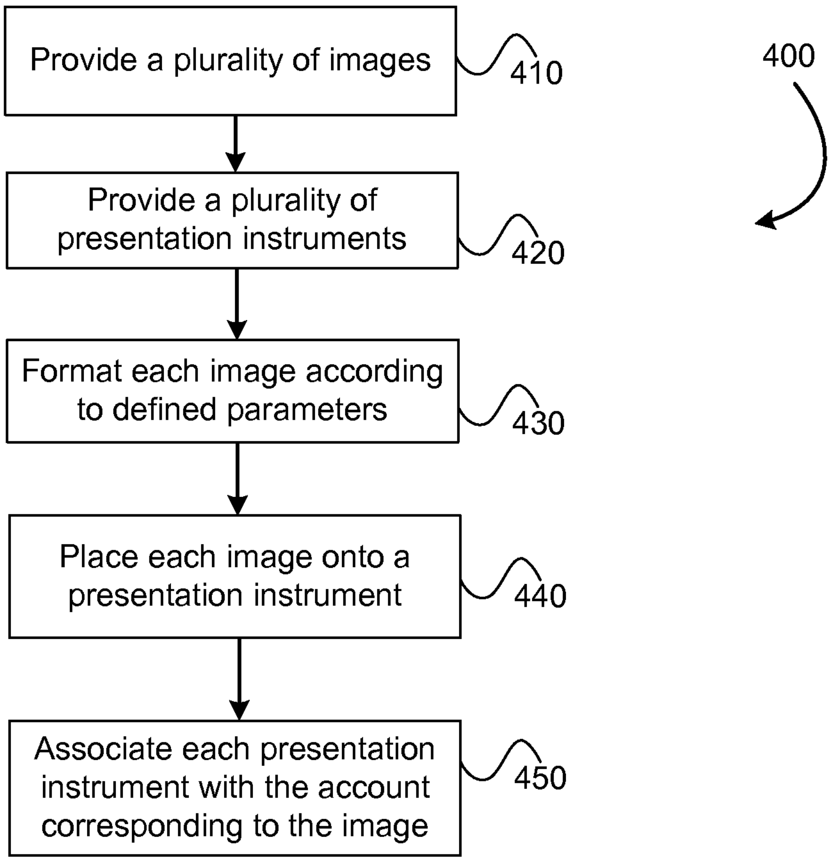

Referring now to FIG. 4, illustrated is a method 400 for placing a plurality of images onto a plurality of presentation instruments to personalize each of the presentation instruments. At block 410, a plurality of images is provided or received as described herein. At block 420, a plurality of presentation instruments is also provided. At block 430, each image of the plurality of images is formatted according to one or more defined parameters, which as described above may include: an image size, a resolution, a brightness, a contrast, an image angle, an image distance, and image boundary, and the like. At block 440, each image is placed onto a presentation instrument to personalize the presentation instrument. At block 450, each of the presentation instruments is associated with an account that corresponds to the image placed on the presentation instrument. As described herein, the account may be a financial account, club account, membership account, employee account, and the like.

In one embodiment, associating the presentation instruments with an account includes writing account data onto a magnetic stripe of the presentation instrument and/or encoding an RFID chip of the presentation instrument. In one embodiment, method 400 also includes determining if the image is allowed to be placed onto the presentation instrument by comparing the image to a database of blacklisted images. Such a comparison may determine that the image is not allowed to be placed onto the presentation instrument. The image may also or alternatively be compared to a database of whitelisted images to determine that the image is allowed to be placed onto the presentation instrument.

In one embodiment, method 400 also includes determining that the image placed onto the presentation instrument meets a defined quality or standard by comparing a hash value of the image with a hash value of the original image provided or received in the plurality of images. Method 400 may further include a process of determining that one or more of the images placed onto the presentation instruments require review by a user, and routing or sending the one or more of the images to the user for review. Input or instructions may be received from the user to adjust one or more parameters or settings of the image or images routed to the user for review.

Figure 5:
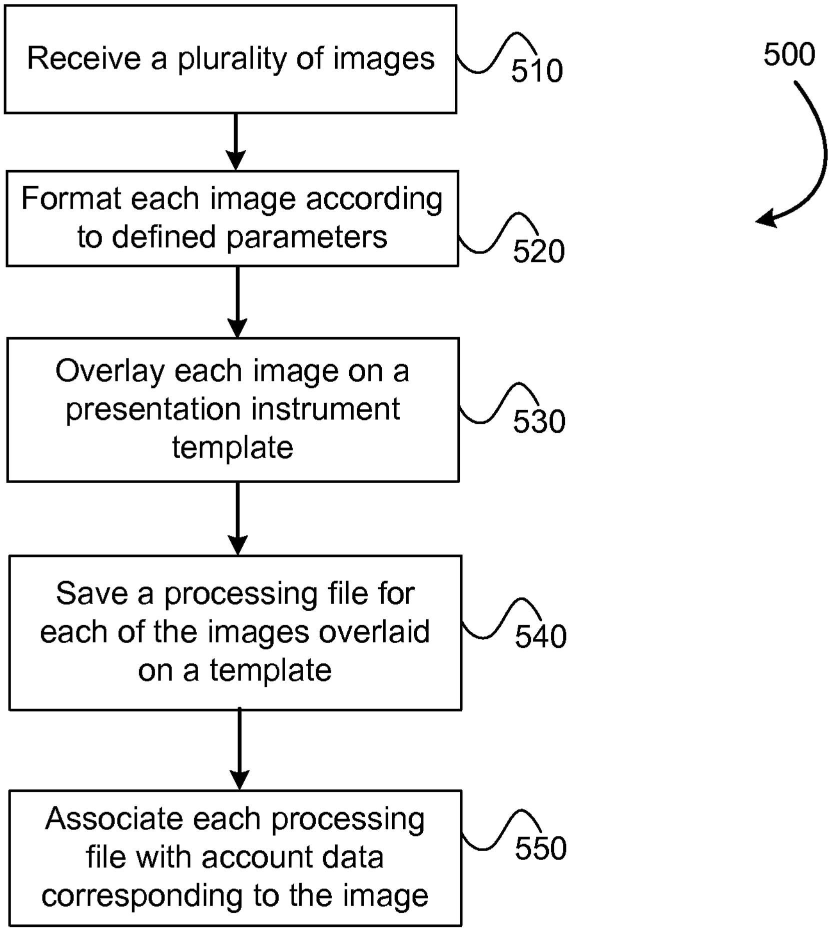

Referring now to FIG. 5, illustrated is another method 500 for personalizing a presentation instruments. At block 510, a plurality of images is provided or received. At block 520, each image is formatted according to one or more defined parameters. At block 530, each of the formatted images is overlaid on a presentation instrument template. The presentation instrument and overlaid image may represent how the image will appear when is it actually overlaid or placed on a presentation instrument. At block 540, a processing file is saved for each of the formatted images overlaid on the presentation instrument templates. The processing files may be individual files of a batch processing file as described above. At block 550, each processing file is associated with account data that corresponds to the image overlaid on the presentation instrument template. The account data may include financial account data, membership account data, club account data, employee account data, and the like. In one embodiment, each of the processing files, or a single batch processing file including all the processing files, may be transmitted to a processing entity or component as described herein so that each of the images and the corresponding account data may be placed onto a presentation instrument.

Figure 6:
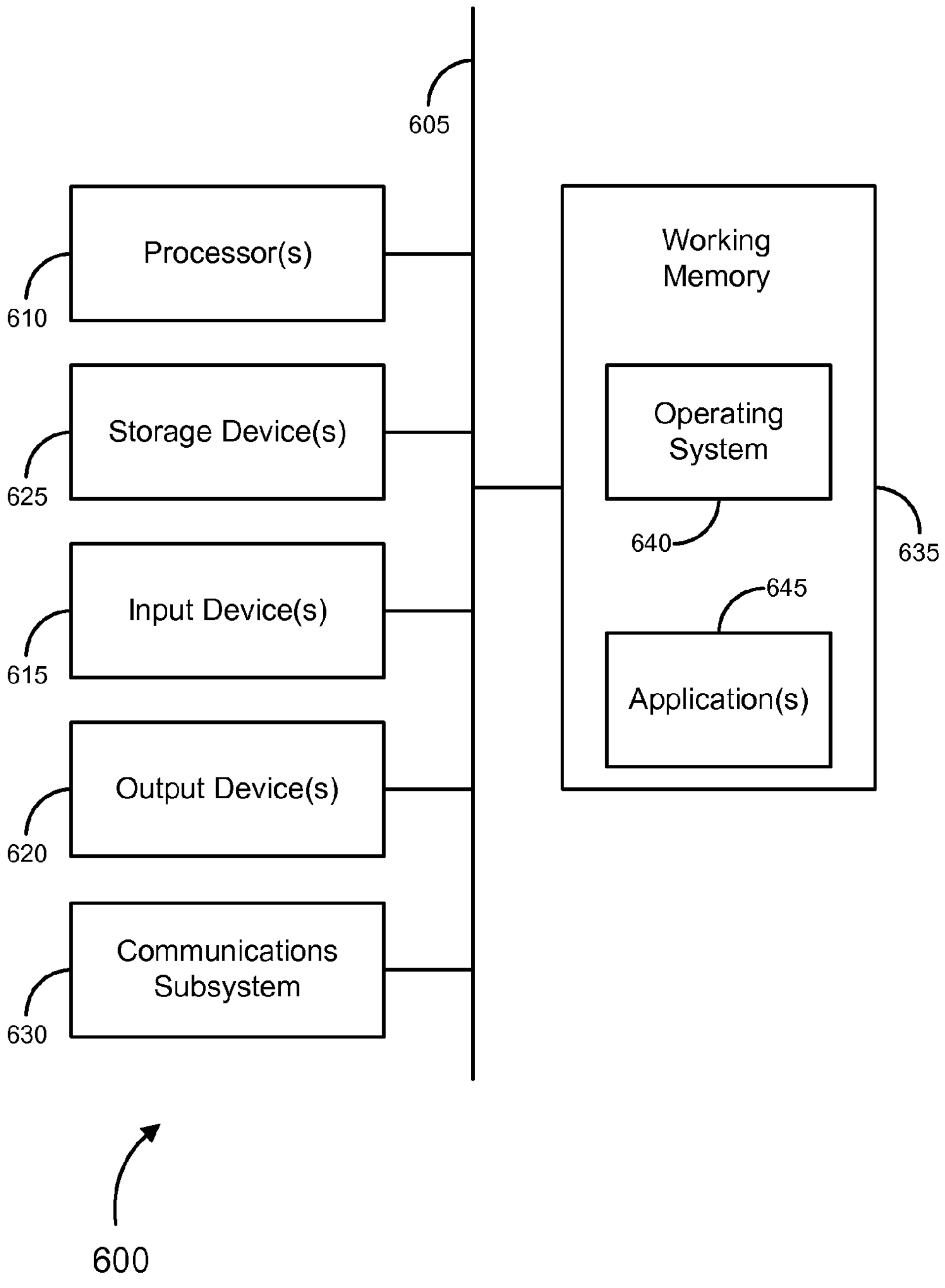
FIG. 6 illustrates an exemplary computer system that may represent any of the components, systems, computing devices, and the like described herein, and/or that may be used to perform the various methods, processes, operations, and the like described herein.

To perform the actions of any of the components, entities, and/or previously mentioned computing devices described herein in a presentation instrument personalization process, a computer system 600 as illustrated in FIG. 6 may be used. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 630 may permit data to be exchanged with a network, other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 625 described above. In some cases, the storage medium might be incorporated within a computer system, such as the system 600. In other embodiments, the storage medium might be separate from a computer system (e.g., a removable medium, such as a compact disc), and or provided in an installation package, such that the storage medium can be used to program, configure and/or adapt a general purpose computer with the instructions/code stored thereon. In still other embodiments, one or more remote servers might provide software as a service/cloud based storage or software service delivery through a browser based or standardized "thin client" application. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor (s) 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire and fiber optics, including the wires that comprise the bus 605, as well as the various components of the communication subsystem 630 (and/or the media by which the communications subsystem 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in a similar manner. Also, it should be emphasized that technology evolves and, thus, many of the elements are examples and should not be interpreted to limit the scope of the invention.

What is claimed is:

1. A method for providing personalized presentation instruments comprising:

providing account information for a plurality of accounts;

providing a plurality of images;

associating each image of the plurality of images with an account;

formatting each image of the plurality of images according to one or more defined parameters to facilitate placement of each image onto a presentation instrument;

overlaying each formatted image of the plurality of images on a presentation instrument so as to personalize each presentation instrument;

associating each presentation instrument with the account corresponding to the image overlaid on the presentation instrument; and comparing the image overlaid on the presentation instrument with the corresponding image of the plurality of images to ensure that the image overlaid on the presentation instrument meets a defined quality, wherein the method is performed using a computer or processor.

2. The method of claim 1, further comprising identifying the account corresponding to the image overlaid on the presentation instrument by comparing an identifier of the image with an identifier of the account.

3. The method of claim 1, further comprising determining that the image is allowed to be overlaid on the presentation instrument.

4. The method of claim 3, wherein determining that the image is allowed to be overlaid on the presentation instrument comprises comparing the image to a database of images that are not allowed to be overlaid on presentation instruments.

5. The method of claim 4, wherein the database of images that are not allowed to be overlaid on presentation instruments comprises one or more images selected from the group consisting of:

a trademark;

a copyrighted image; and a blacklisted image.

6. The method of claim 1, wherein comparing the image overlaid on the presentation instrument with the corresponding image of the plurality of images comprises comparing a hash value of the image overlaid on the presentation instrument with a hash value of the corresponding image of the plurality of images.

7. The method of claim 1, further comprising:

determining that one or more of the images overlaid on the presentation instruments require review by a user; and routing the one or more of the images to the user for review.

8. A method for placing a plurality of images onto a plurality of presentation instruments to personalize each of the presentation instruments, the method comprising:

providing a plurality of images, each of the plurality of images comprising a facial image of an individual;

providing a plurality of presentation instruments;

receiving a particular image provided by a user to be associated with a particular presentation instrument;

determining, via facial recognition software, that the particular image provided by the user represents the same person as a specific image of the plurality of images;

replacing the specific image in the plurality of images with the particular image provided by the user;

formatting each image of the plurality of images according to one or more defined parameters;

placing each image on a presentation instrument so as to personalize each presentation instrument; and associating each of the presentation instruments with an account corresponding to the image placed on the presentation instrument, wherein the method is performed using a computer or processor.

9. The method of claim 8, wherein associating each of the presentation instruments with an account comprises writing account data onto a magnetic stripe of the presentation instrument or encoding an RFID chip of the presentation instrument.

10. The method of claim 8, wherein formatting each image comprises adjusting a spacing of at least one of the images.

11. The method of claim 10, further comprising determining if the image is allowed to be placed on the presentation instrument by comparing the image to a database of blacklisted images to determine that the image is not allowed to be placed on the presentation instrument, or comparing the image to a database of whitelisted images to determine that the image is allowed to be placed on the presentation instrument.

12. The method of claim 8, wherein formatting each image comprises adjusting an angle of at least one of the images.

13. The method of claim 8, further comprising determining that the image placed on the presentation instrument meets a defined quality by comparing a hash value of the image placed on the presentation instrument with a hash value of the corresponding image of the plurality of images.

14. The method of claim 13, further comprising:

determining that one or more of the images placed on the presentation instruments require review by a user; and routing the one or more of the images to the user for review.

15. The method of claim 14, further comprising receiving input from the user to adjust one or more parameters of the one or more of the images routed to the user for review.

16. A system for providing personalized presentation instruments comprising:

a memory device; and a processor communicatively coupled with the memory device, the memory device having instructions stored thereon which, when executed by the processor, cause the processor to:

receive a plurality of images;

format each image of the plurality of images according to one or more defined parameters;

overlay each formatted image on a presentation instrument to personalize each presentation instrument;

comparing the image overlaid on the presentation instrument with the corresponding image of the plurality of images to ensure that the image overlaid on the presentation instrument meets a defined quality; and associate each presentation instrument with an account corresponding to the image overlaid on the presentation instrument.

17. The system of claim 16, wherein ensuring that the image overlaid on the presentation instrument meets a defined quality comprises comparing a hash value of the image with a hash value of a corresponding image of the plurality of images.

18. A method for personalizing a presentation instruments comprising:

receiving a plurality of images, each of the plurality of images comprising a facial image of an individual;

receiving a particular image provided by a user to be associated with a particular presentation instrument;

determining, via facial recognition software, that the particular image provided by the user represents the same person as a specific image of the plurality of images;

replacing the specific image in the plurality of images with the particular image provided by the user;

formatting each image of the plurality of images according to one or more defined parameters;

overlaying each formatted image on a presentation instrument template;

saving a processing file for each of the formatted images overlaid on the presentation instrument templates; and associating each processing file with account data corresponding to the image overlaid on the presentation instrument template, wherein the method is performed using a computer or processor.

19. The method of claim 18, further comprising transmitting each of the processing files to a processing entity so that each of the images and corresponding account data are overlaid on a presentation instrument.

* * * * *